(12) United States Patent
Lortz

(10) Patent No.: US 6,859,881 B2
(45) Date of Patent: Feb. 22, 2005

(54) METHOD AND SYSTEM FOR MAPPING NETWORK ATTACKS ONTO A STRATEGY GAME

(75) Inventor: Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 856 days.

(21) Appl. No.: 09/818,934

(22) Filed: Mar. 28, 2001

(65) Prior Publication Data

US 2002/0144146 A1 Oct. 3, 2002

(51) Int. Cl.[7] .............................................. G06L 11/30
(52) U.S. Cl. ...................................... 713/201; 345/736
(58) Field of Search ................................ 713/200, 201; 714/46; 345/736; 709/223, 224

(56) References Cited

U.S. PATENT DOCUMENTS 6,173,418 B1 * 1/2001 Fujino et al. ................. 714/20
6,353,385 B1 * 3/2002 Molini et al. ............... 340/506
6,405,318 B1 * 6/2002 Rowland ..................... 713/200

OTHER PUBLICATIONS

"Automated Network Monitoring", MIT Webpage, Jan. 1996 <http://www.ai.mit.edu/projects/iiip/conferences/survey96/abrams/talk.html>, pp. 1–5.*
"Chitra", VT webpage, Dec. 1, 1998 <http://web.archive.org/web/19981201062031/http://www.cs.vt.edu/~chitra/>, pp. 1–2.*
"Age of Empires II", Microsoft webpage, Jul. 14, 2000 <http://web.archive.org/web/20000614094435/www.gamespot.com/features/aoe2_briton/index.html>, pp. 1–2.*

* cited by examiner

Primary Examiner—Andrew Caldwell
Assistant Examiner—Michael Pyzocha
(74) Attorney, Agent, or Firm—Sharmini N. Green

(57) ABSTRACT

A method and system for mapping network attacks onto a strategy game is presented. A log file generated by network security monitoring tools is received by a transformer. The log file is transformed by the transformer into a set of characters with associated action inputs, such that each of the characters is associated with an action input.

30 Claims, 4 Drawing Sheets

METHOD AND SYSTEM FOR MAPPING NETWORK ATTACKS ONTO A STRATEGY GAME

BACKGROUND

1. Field

This invention relates in general to computer network security. Specifically, this invention relates to methods and systems for mapping network attacks.

2. General Background and Related Art

A goal of network security is to ensure safe and reliable network operations. Various network security components, such as firewalls, are designed to prevent illegal intrusions. These components often monitor network activities and record various types of information relating to these activities. For example, firewalls may keep a log file that lists all accesses to the computer systems protected by the firewalls. For each access, the ID of the user who made the access, the time of the access, the location of the access, and the manner in which the access took place (remotely or locally) may be recorded. Log files generated by network security components are typically voluminous.

To detect a security breach such as an attack by a hacker, one needs to understand the information embedded in log files. However, interpretation of log files, which contain information indicating the severity and extent of network problems, may require significant technical expertise. Attempts have been made to transform raw log data into understandable forms. For example, color-coded histograms may be generated from raw log files to provide graphical views of the information embedded therein. Yet, interpretation of histograms also requires substantial technical knowledge.

Log files generated by network security monitoring tools may contain vendor-specific types of information presented in distinct forms. This increases the burden on network system administrators and other users. For example, the log file for a particular type of firewall, generated by vendor A's security monitoring system, may be very different from the log file for a server computer, generated by vendor B's security monitoring system. The two log files may include different types of information in different vendor-specific formats.

The Intrusion Detection Message Exchange Format (IDMEF) has recently been proposed to define data formats and exchange procedures for sharing information between different network security tools. However, this format retains the low-level data semantics of log files generated by vendor-specific network security tools. Significant effort and technical expertise are required to analyze and understand IDMEF log files.

Therefore, what is needed is a system and method to effectively convey different types of log data to users.

DETAILED DESCRIPTION

Figure 1:
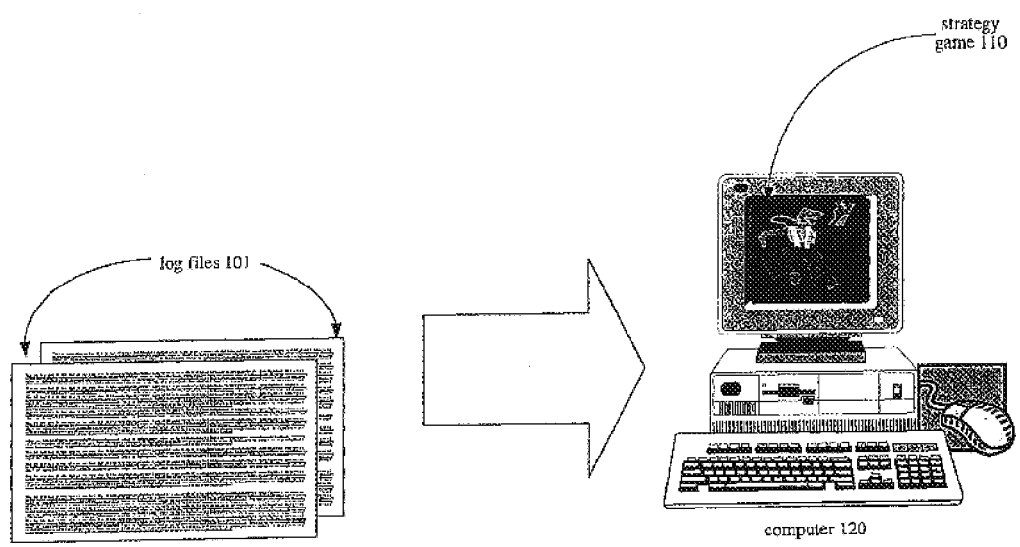
FIG. 1 is a high-level diagram illustrating a principle of the present invention.

The following detailed description refers to the accompanying drawings that illustrate exemplary embodiments of the present inventions. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A method and system for mapping network attacks onto a strategy game, as described herein, involves receiving at least one log file generated by network security monitoring tools. The log file is received by a transformer. The transformer transforms the log file into a set of characters with associated action inputs, such that each of the characters is associated with an action input.

Some aspects of network security relate to aspects of computer games. For instance, network attacks, responses, resource acquisition, vulnerabilities, territory, and the like may have analogues in computer games. As such, network events contained in security log files may be represented by various characters taking various actions within a strategy game. Accordingly, a network administrator may view security data as if it were a recorded session of a computer game, such as Microsoft Corporation's Age of Empires. For instance, a port scan initiated by a remote hacker may appear as a scout character moving along a fortified wall searching for vulnerabilities. If a vulnerable port is found by the hacker, a subsequent attack on the port by the hacker may be represented by a directed attack by another character from the same army as the scout. Such a mapping may convey network status in an intuitive, comprehensive manner.

FIG. 1 is a high-level diagram illustrating a principle of the present invention. As shown, one or more log files 101 are transformed into a representation, such as a strategy game 110. Strategy game 110 may be shown on a display of a computer 120. Log files 101 may comprise various vendor-specific files generated by off-the-shelf network security monitoring tools. Log files 101 may also comprise shareware or proprietary network security monitoring tools. Such files may chart network activity from various network vantage points.

Figure 2:
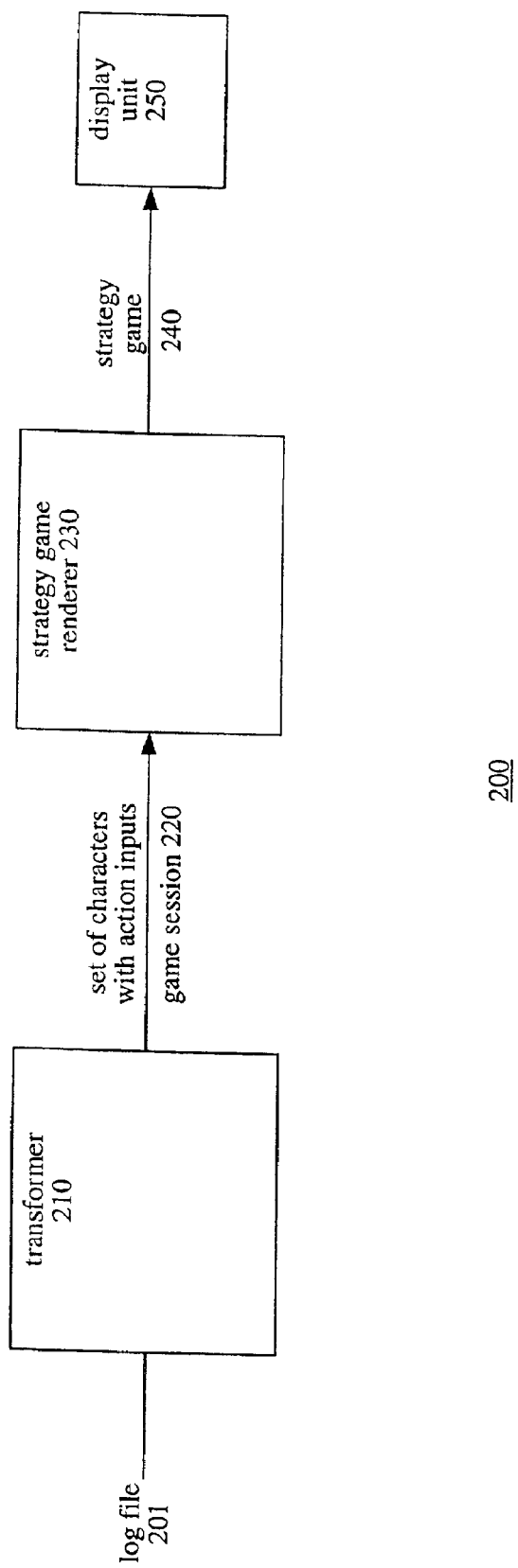
FIG. 2 is a block diagram of a system according to an embodiment of the present invention.

FIG. 2 is a high-level block diagram of system 200 according to an embodiment of the present invention. System 200 comprises transformer 210, strategy game renderer 230, and display unit 250. Transformer 210 receives one or more log files 201 generated by network security monitoring tools. Transformer 210 may process different types of log files 201. Transformer 210 transforms log files 201 into a set of characters with associated action inputs. Each of the characters may be associated with an action input. The set of characters with associated action inputs may comprise a game session 220.

Game session 220 may comprise a file saved in the format of a game session of a strategy game. Strategy games may have vendor-specific game session formats. Thus, transformer 230 may output game sessions 220 of differing formats.

Strategy game renderer 230 may comprise strategy game software. Strategy game renderer 230 receives game session 220. If game session 220 is compatible with strategy game renderer 230, strategy game renderer 230 renders game session 220 in the form of a strategy game 240, such as Age of Empires. Strategy game 240 may be displayed on display unit 250.

Figure 3:
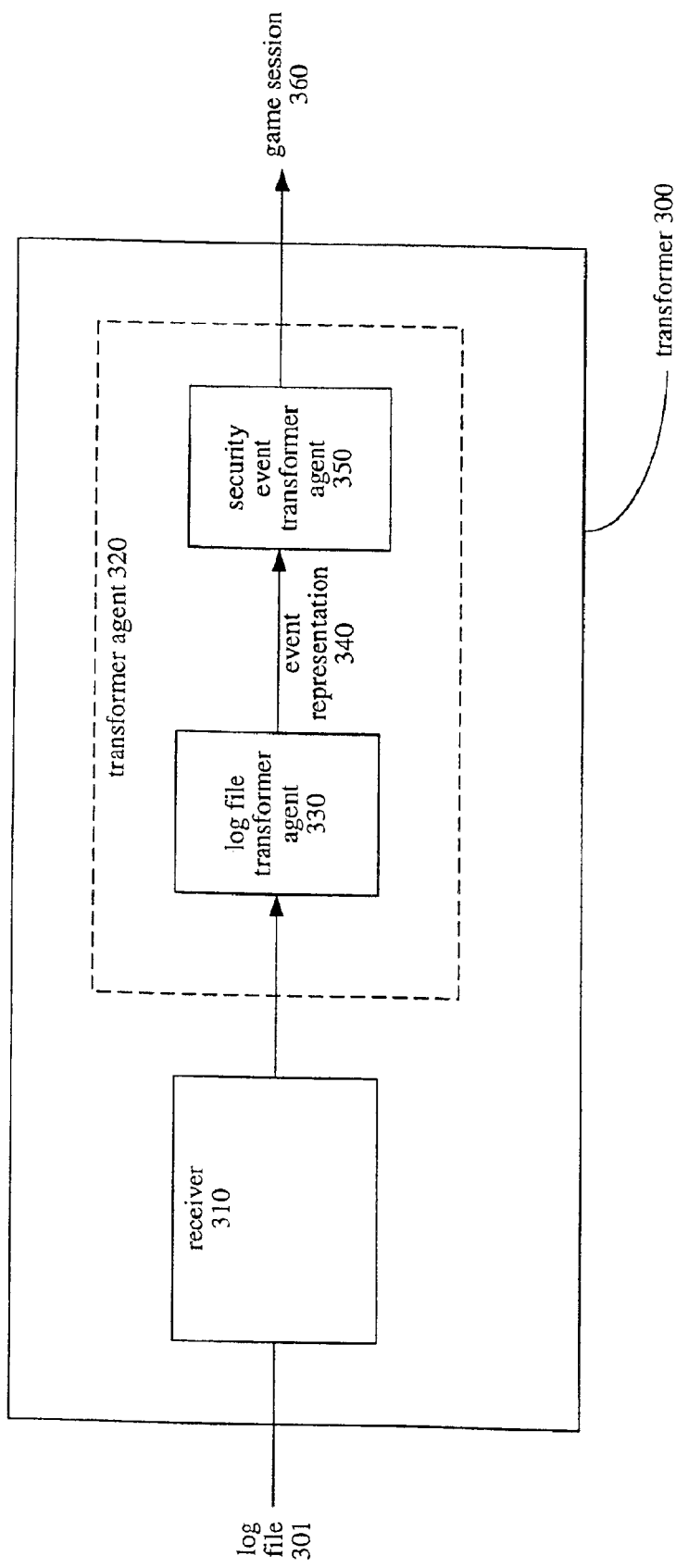
FIG. 3 is a block diagram of a transformer according to an embodiment of the present invention.

FIG. 3 is a high-level block diagram illustrating transformer 300 according to an embodiment of the present invention. Transformer 300 comprises receiver 310 and transformer agent 320.

Receiver 310 receives one or more log files 301 generated by network security monitoring tools. Transformer agent 320 may convert log files 301 into zero or more event representations. Such event representations may be vendor-independent. For example, transformer agent 320 may parse a log file 301, analyze log file 301, and identify that a port scan has been undertaken by a remote hacker. This event may be represented by an event representation, which may include a unique code. Each identified port scan may be designated by the same code. Transformer agent 320 may then map codes designating port scans and other such event representations to one or more game sessions 360.

Transformer agent 320 may comprise a number of subsidiary agents, such as one or more log file transformer agents 330 and one or more security event transformer agents 350. Log file transformer agents 330 may convert log files 301 into zero or more event representations 340. Security event transformer agents 350 may map the event representations 340 into a set of characters with associated action inputs, such as game session 360. Although FIG. 3 shows one log file transformer agent 330 and one security event transformer agent 350, multiple agents may be included in other embodiments of transformer 300.

Each type of log file 301 may have a corresponding log file transformer agent 330, which converts that type of log file into one or more vendor-independent event representations 340. In other words, each network security monitoring tool that generates a type of log file may have a corresponding log file transformer agent 330. Conversion of log file 301 into event representations 340 may comprise a number of steps. In some embodiments, log file transformer agent 330 may analyze each of the log files 301 with which log file transformer agent 330 is compatible, detect zero or more events based on the results of the analysis, and generate event representations 340 for the events detected. In an exemplary implementation, event representations may be arranged in a canonical form, such as one embodied in an XML file.

Security event transformer agent 350 may map event representations 340 into a vendor-specific game session 360 by various techniques. For instance, event representations 340 may be processed, a character may be selected or assigned to each of the event representations 340, and an action input to associate with each of the selected characters may be determined based on each of the event representations 340. The set of characters and associated action inputs may then be stored as game session 240.

Each type of security event transformer agent 350 may correspond to a particular strategy game. For instance, a security event transformer agent 350 for Age of Empires may produce an Age of Empires game session. In embodiments that include multiple security event transformer agents 350, multiple game sessions may be produced. As such, the same set of log data may be viewed within the context of a number of strategy games.

Figure 4:
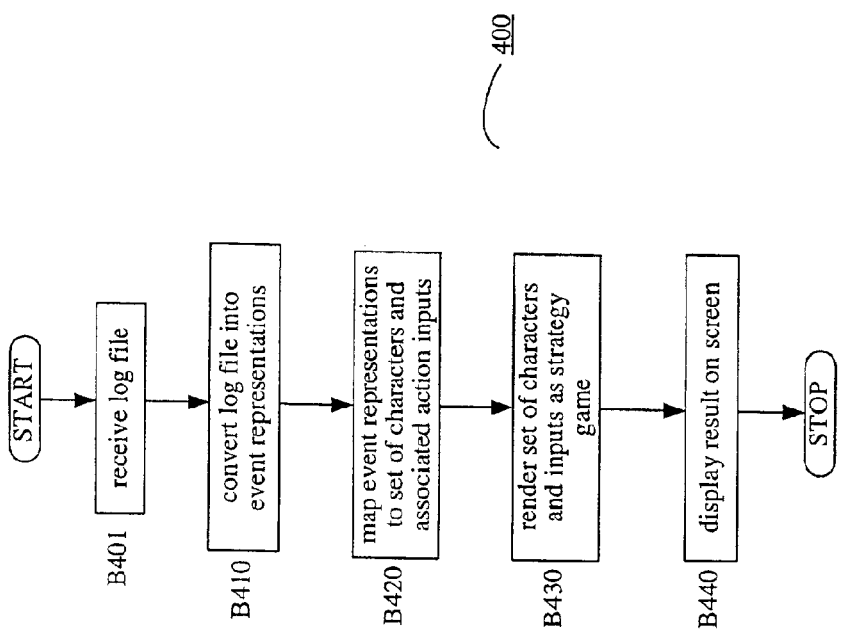
FIG. 4 is a flow diagram illustrating a method according to an embodiment of the present invention.

FIG. 4 is a flow diagram of method 400 according to an embodiment of the present invention. In block B401, a log file is received. In block B410, the log file is converted into one or more event representations. These event representations are mapped to a set of characters and associated action inputs in block B420. The set of characters and associated action inputs is then rendered as a strategy game in block B430. The results of the rendering may be displayed on a screen, as indicated by block B440.

The foregoing description of the preferred embodiments is provided to enable any person skilled in the art to make or use the present invention. Various modifications to these embodiments are possible, and the generic principles presented herein may be applied to other embodiments as well. For instance, the present invention may be implemented in contexts other than network security contexts, such as in voicemail, e-mail, or other such messaging systems. Log files detailing messaging activities by various remote callers or senders may be mapped to a set of characters and associated action inputs, and rendered as a strategy game.

Moreover, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed:

1. A method for mapping network attacks onto a strategy game, said method comprising:
   receiving, by a transformer, at least one log file, generated by network security monitoring tools; and
   transforming, by said transformer, said at least one log file into a set of characters with associated action inputs, wherein at least one of said characters is associated with an action input.

2. The method according to claim 1, wherein said network security monitoring tools include off-the-shelf network security monitoring tools.

3. The method according to claim 1, wherein said at least one log file includes different types of vendor-specific log files, generated by corresponding vendor-specific network security monitoring tools.

4. The method according to claim 1, further comprising:
   converting, using at least one log file transformer agent, said at least one log file into one or more event representations; and
   mapping, by a security event transformer agent, said one or more event representations to said set of characters and said associated action inputs.

5. The method according to claim 4, wherein said event representations include a vendor-independent representation.

6. The method according to claim 4, wherein each of said log file transformer agents corresponds to one of said network security monitoring tools and converts a type of log file generated by said one of said network security monitoring tools to said event representation.

7. The method according to claim 4, wherein said converting comprises:

analyzing each of said at least one log file generated by one of said network security monitoring tools;

detecting one or more events based at least in part on the result from said analyzing; and generating said one or more event representations for said one or more events.

8. The method according to claim 4, wherein said mapping comprises:

processing said one or more event representations;

selecting a character for each of said event representations;

determining an action input associated with each of said selected characters based at least in part on said each of said event representations; and storing said character and said associated action input in a format as a game session.

9. The method according to claim 8, wherein said format includes a saved session format of a strategy game.

10. The method according to claim 1, further comprising:

rendering said set of characters and said associated action inputs in the form of a strategy game; and displaying a result of said rendering on a screen of a display unit.

11. A transformer for mapping network attacks onto a strategy game, said transformer comprising:

a receiver configured to receive at least one log file generated by network security monitoring tools; and a transformer agent configured to transform said at least one log file into a set of characters with associated action inputs, wherein each of said characters is associated with an action input.

12. The transformer according to claim 11, wherein said network security monitoring tools include off-the-shelf network security monitoring tools.

13. The transformer according to claim 11, wherein said at least one log file includes different types of vendor-specific log files, generated by corresponding vendor-specific network security monitoring tools.

14. The transformer of claim 11, wherein said transformer agent comprises:

at least one log file transformer agent configured to convert said at least one log file into one or more event representations; and a security event transformer agent configured to map said one or more event representations to said set of characters and said associated action inputs.

15. The transformer according to claim 14, wherein said event representations include a vendor-independent representation.

16. The transformer according to claim 14, wherein each of said log file transformer agents corresponds to one of said network security monitoring tools and converts a type of log file generated by said one of said network security monitoring tools to said event representation.

17. The transformer according to claim 14, wherein said at least one log file transformer agent analyzes each of said at least one log file generated by one of said network security monitoring tools, detects one or more events based at least in part on the result from said analyzing, and generates said one or more event representations for said one or more events.

18. The transformer according to claim 14, wherein said security event transformer agent processes said one or more event representations, selects a character for each of said event representations, determines an action input associated with each of said characters, and stores said character and said associated action input in a format as a game session.

19. The transformer according to claim 18, wherein said format includes a saved session format of a strategy game.

20. A system for mapping network attacks onto a strategy game, said system comprising:

a transformer configured to receive at least one log file generated by network security monitoring tools, and to transform said at least one log file into a set of characters with associated action inputs, wherein each of said characters is associated with an action input; and a strategy game rendering mechanism, said rendering mechanism configured to render said set of characters and said associated action inputs in the form of a strategy game.

21. The system according to claim 20, further comprising a display unit coupled to said strategy game rendering mechanism, said display unit having a screen configured to display said strategy game.

22. A computer-readable medium encoded with a plurality of processor-executable instructions for:

receiving, by a transformer, at least one log file, generated by network security monitoring tools; and transforming, by said transformer, said at least one log file into a set of characters with associated action inputs, wherein each of said characters is associated with an action input.

23. The computer-readable medium according to claim 22, wherein said network security monitoring tools include off-the-shelf network security monitoring tools.

24. The computer-readable medium according to claim 22, wherein said at least one log file includes different types of vendor-specific log files, generated by corresponding vendor-specific network security monitoring tools.

25. The computer-readable medium according to claim 22, further comprising processor-executable instructions for:

converting, using at least one log file transformer agent, said at least one log file into one or more event representations; and mapping, by a security event transformer agent, said one or more event representations to said set of characters and said associated action inputs.

26. The computer-readable medium according to claim 25, wherein said event representations include a vendor-independent representation.

27. The computer-readable medium according to claim 25, wherein each of said log file transformer agents corresponds to one of said network security monitoring tools and converts a type of log file generated by said one of said network security monitoring tools to said event representation.

28. The computer-readable medium according to claim 25, wherein said converting comprises:

analyzing each of said at least one log file generated by one of said network security monitoring tools;

detecting one or more events based at least in part on the result from said analyzing; and generating said one or more event representations for said one or more events.

29. The computer-readable medium according to claim 25, wherein said mapping comprises:

processing said one or more event representations;

selecting a character for each of said event representations;

determining an action input associated with each of said selected characters based at least in part on said each of said event representations; and storing said character and said associated action input in a format as a game session.

30. The computer-readable medium according to claim 29, wherein said format includes a saved session format of a strategy game.

* * * * *